US006657017B2

(12) United States Patent
Wo et al.

(10) Patent No.: US 6,657,017 B2
(45) Date of Patent: Dec. 2, 2003

(54) SULFONATED POLYESTER COMPOUNDS WITH ENHANCED SHELF STABILITY AND PROCESSES OF MAKING THE SAME

(75) Inventors: Shiming Wo, Summerville, SC (US); Jeanne Chang, Madison, NJ (US); Stephen Kauder, Auburn, GA (US)

(73) Assignee: Rhodia Inc, Cranbury, NJ (US)

(*) Notice: Subject to any disclaimer, the term of this patent is extended or adjusted under 35 U.S.C. 154(b) by 0 days.

(21) Appl. No.: 10/201,018

(22) Filed: Jul. 23, 2002

(65) Prior Publication Data

US 2003/0096944 A1 May 22, 2003

Related U.S. Application Data

(60) Provisional application No. 60/307,966, filed on Jul. 27, 2001.

(51) Int. Cl.$^7$ .............................. C08F 20/00; C02F 5/02

(52) U.S. Cl. ........................ 525/444; 528/295; 528/300; 528/302; 528/308; 528/308.6; 252/175

(58) Field of Search ................................ 528/295, 300, 528/302, 308, 308.6; 525/444; 252/175

(56) References Cited

U.S. PATENT DOCUMENTS

| | | | |
|---|---|---|---|
| 3,557,039 | A | 1/1971 | McIntyre et al. |
| 3,962,152 | A | 6/1976 | Nicol et al. |
| 4,427,557 | A | 1/1984 | Stockburger |
| 4,702,857 | A | 10/1987 | Gosselink |
| 4,861,512 | A | 8/1989 | Gosselink |
| 4,863,619 | A | 9/1989 | Borcher, Sr. et al. |
| 4,925,577 | A | 5/1990 | Borcher, Sr. et al. |
| 4,925,588 | A | 5/1990 | Berrod et al. |
| 4,999,128 | A | 3/1991 | Sonenstein |
| 5,041,230 | A | 8/1991 | Borcher, Sr. et al. |
| 5,142,020 | A | 8/1992 | Kud et al. |
| 5,599,782 | A | 2/1997 | Pan et al. |
| 5,728,671 | A | 3/1998 | Rohrbaugh et al. |
| 5,786,318 | A | 7/1998 | Blokzijl et al. |
| 5,789,365 | A | 8/1998 | Blokzijl et al. |
| 5,789,366 | A | 8/1998 | Blokzijl et al. |
| 5,789,367 | A | 8/1998 | Blokzijl et al. |

*Primary Examiner*—Samuel A. Acquah
(74) *Attorney, Agent, or Firm*—Watov & Kipnes, P.C.

(57) ABSTRACT

A sulfonated polyester compound useful as a soil release agent having isophthalate and terephthalate groups wherein the molar ratio of isophthalate groups to terephthalate groups is at least 0.15.

8 Claims, No Drawings

SULFONATED POLYESTER COMPOUNDS WITH ENHANCED SHELF STABILITY AND PROCESSES OF MAKING THE SAME

This application claims the benefit of provisional application Ser. No. 60/307,966 filed Jul. 27, 2001.

FIELD OF THE INVENTION

The present invention is directed to sulfonated polyester compounds suitable for use as a soil releasing agent having enhanced shelf stability in which the molar ratio of isophthalate groups to terephthalate groups is controlled to minimize crystallization of the polymer.

BACKGROUND OF THE INVENTION

Sulfonated polyester compounds are known for removing soil and stains from a variety of substrates including filaments, fibers, fabrics, films and the like. Low molecular weight sulfonated polyester compounds are typically employed as soil release agents in laundry detergents while higher molecular weight sulfonated polyester compounds have been used for textile sizing.

U.S. Pat. No. 3,962,152 discloses a detergent composition containing polymers as soil release agents which are obtained by reacting dimethyl terephthalate with polyethylene glycol.

U.S. Pat. Nos. 4,863,619; 4,925,577 and 5,041,230 generally disclose methods of improving the processability of soil release polymers.

U.S. Pat. No. 4,999,128 discloses copolymers of poly (ethylene terephthalate/ethylene isophthalate) and related copolymers which are produced by reacting the esters with polyethylene glycol.

U.S. Pat. No. 5,142,020 discloses soil release promoters and detergents which are obtained by the polymerization of monomers such as dicarboxylic acid/ester/anhydride, dihydric alcohols and polyethylene glycols.

Sulfonated polyester compounds have received increased attention as effective soil release agents. For example, U.S. Pat. No. 3,557,039 discloses a stable aqueous dispersion comprising water and a water insoluble crystallizable block or graph polymeric compound which contains linear polyethylene terephthalate segments having sufficient ethylene terephthalate units to confer crystallinity to the compound. These polymers are prepared by reacting monomers which include dimethyl sodium sulfoisophthalate.

U.S. Pat. No. 4,427,557 discloses sulfonated copolymers used for preparing anionic textile treating compositions in which the polymerizable monomers include dimethyl sulfoisophthalate.

U.S. Pat. No. 4,702,857 discloses sulfonated copolymers used as soil release agents in detergent formulations in which the copolymers are obtained by polymerizing monomers such as dimethyl terephthalate, dimethyl sulfoisophthalate, polyethylene glycol and polyethylene glycol monoether.

U.S. Pat. No. 5,599,782 also discloses sulfonated polyester compounds useful as soil release agents. Polymerizable monomers which are mentioned in the reference include m-sodiosulfobenzoic acid, dimethylsodiosulfoisophthalate, dimethyl terephthalate, terephthalic acid and ethylene glycol.

U.S. Pat. No. 5,728,671 discloses sulfonated polyester compounds useful as soil release agents having whitening properties.

U.S. Pat. No. 5,786,318 discloses polymerizing monomers such as sulfonated aromatic dicarboxylic acids to produce soil release polymers for detergent compositions. Other soil release polymers containing sulfonated polymers are disclosed in U.S. Pat. Nos. 5,789,365; 5,789,366; and 5,789,367.

The market for polyester compounds for use as soil releasing agents and particularly sulfonated polyester compounds for this purpose has increased significantly in recent years. However, such polyester compounds are adversely affected by high humidity conditions and particularly there may be a loss of soil release properties. It was believed that the reduction in soil release properties was not due to chemical degradation of the sulfonated polyester compound under high humidity conditions. However, Applicants believe that the loss of soil release properties is due to crystallization of the polyester compound rendering it less soluble in water than its desirable amorphous state. As a result at least a portion of the polyester compound crystallizes out of solution rendering it ineffective as a soil release agent.

SUMMARY OF THE INVENTION

The present invention is generally directed to sulfonated polyester compounds with enhanced shelf stability and processes of making the same. The sulfonated polyester compounds are characterized by having an isophthalate group to terephthalate group molar ratio of at least 0.15. The sulfonated polyester compounds are particularly useful as soil release agents and have enhanced shelf stability due to the minimization of crystallization of the polymers during extended exposure to high humidity conditions.

In a particular aspect of the present invention, there is provided a sulfonated polyester compound useful as a soil release agent having isophthalate and terephthalate groups wherein the molar ratio of isophthalate groups to terephthalate groups is at least 0.15, preferably from about 0.25 to 0.33.

DETAILED DESCRIPTION OF THE INVENTION

Applicants have discovered in accordance with the present invention that the soil release properties of sulfonated polyesters are reduced under high humidity conditions. Applicants have discovered that the reason for the reduction in soil release properties arises due to the crystallization of the polymer in that the crystalline phase is less soluble in water than the desirable amorphous phase. Applicant has further discovered that by employing the molar ratio of isophthalate groups to terephthalate groups in accordance with the present invention, conversion from the amorphous phase to the crystalline phase is minimized and any reduction of soil released properties is thereby minimized.

The present invention concerns sulfonated polyester compounds. The sulfonated substituents of the compounds are preferably selected from the group consisting of 5-sulfoisophthalic acid and esters thereof, sulfobenzoic acid and esters thereof and isethionates. The esters for the above-mentioned acids may be any suitable ester providing a sulfonate group suitable for a polyester compound to serve as a soil release agent. Preferred acid and esters include dimethyl-5-sulfoisophthalate, 5-sodioisophthalic acid and 3-sodiosulfobenzoic acid.

The sulfonated polyester compounds typically comprise monomers selected from dicarboxylic acids and esters thereof and polyols. The typical dicarboxcylic acids and esters are selected from the group consisting of terephthalic acid, alkyl esters of terephthalic acid, phthalic acid, phthalic anhydride, alkyl esters of phthalic acid, succinic acid, substituted succinic acid wherein the substituents may be selected from dimethyl, diethyl and dibutyl, esters of succinic acid, succinic anhydrides, adipic acid, and esters of adipic acid and combinations thereof. The esters of succinic acid include dimethyl, diethyl and dibutyl esters and the esters of adipic acid include dimethyl, diethyl and dibutyl esters.

The polyols that may be used as monomers in forming the sulfonated polyester compounds are those preferably selected from the group consisting of ethylene glycol, 1,2-propanediol, 1,3-propanediol, glycerol and neopentyl glycol.

The sulfonated polyester compounds of the present invention can be made by a variety of ways known to those of ordinary skill in the art including processes provided in the background portion of the present application.

A preferred process for making sulfonated polyester compounds is disclosed in U.S. patent application Ser. No. 09/726,762 filed Nov. 30, 2000 owned by the Assignee herein, the entire content of which is incorporated herein by reference.

In general, the preferred process is one in which a sulfonated acid or corresponding alkyl ester is reacted with a hydroxy-containing compound to produce a sulfonated ester intermediate compound which is then reacted with a polyester compound selected to afford the final polyester compound with a desirable molecular weight. In particular, the preferred method of producing a sulfonated polyester compound suitable for use as a soil releasing agent and/or textile sizing agent in accordance with the present invention comprises:

a) reacting at least one compound of Formula (I)

$$XSO_3—R—(COOY)n \qquad (I)$$

wherein X is a cation,

R is an aryl group,

Y is selected from the group consisting of hydrogen and an alkyl group, and n is a positive integer with at least one compound of Formula (II)

$$R_1—(OH)m \qquad (II)$$

wherein $R_1$ is selected from the group consisting of an alkyl group, a cycloalkyl group and an aryl group, which may be substituted with an alkyl group or an aryl group, and m is a positive integer and optionally with a compound of Formula (III)

$$R_2—(COOZ)p \qquad (III)$$

wherein $R_2$ is selected from the group consisting of an alkyl group and an aryl group, Z is selected from the group consisting of hydrogen and an alkyl group, and p is a positive integer, and optionally with a compound of Formula (IV):

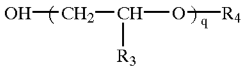

(IV)

wherein $R_3$ and $R_4$ are each independently selected from the group consisting of hydrogen and an alkyl group, and q is a positive integer to produce at least one ester compound intermediate, and reacting the resulting ester compound intermediate with a homo- or co-poly (ethylene terephthalate) to produce the sulfonated polyester.

The process described above can provide suitable sulfonated polyester compounds with the desirable molar ratio of isophthalate groups to terephthalate groups by controlling the respective amounts of the isophthalate and terephthalate-containing compounds.

EXAMPLE 1

Preparation of Sulfonated Polyester Compound 290 grams of ethylene glycol, 200 grams of sodiosulfoisophthalic acid and 1.1 grams of titanium (iv) triethanolaminatol isopropoxide were added to a one liter flask equipped with a fractional distillation column. The mixture was heated to 185° C. for 30 minutes. Thereafter, 370 grams of a copolymer of ethylene terephthalate and ethylene isophthalate having an isophthalate/terephthalate molar ratio of 0.33 was added to the heated vessel. The vessel was heated to 235° C. until the above-mentioned copolymer was dissolved. Thereafter, 447 additional grams of the above-mentioned copolymer was added to the vessel and the temperature was raised to 250° C. and held for two hours. The vessel was allowed to cool to 165° C. and the resulting sulfonated polyester compound was thereafter discharged from the vessel.

EXAMPLES 2–5

Soil Release Compounds in Accordance With the Present Invention

Soil release compounds in accordance with the present invention and identified as Examples 2–5 were prepared in the same manner as Example 1 except that the molar ratio of isophthalate groups to terephthalate groups was altered as indicated in Table 1. In particular, Example 2 had an isophthalate group to terephthalate group molar ratio of 0.18, Example 3, the molar ratio was 0.25, Example 4 the molar ratio was 0.54 and Example 5 the molar ratio was 0.67.

TABLE 1

| Example | Isophthalate/ Terephthalate ratio |
|---|---|
| 1 | 0.33 |
| 2 | 0.18 |
| 3 | 0.25 |
| 4 | 0.54 |
| 5 | 0.67 |
| Comparative | 0.04 |

A comparative example was prepared in the same manner as Example 1 except that the molar ratio of isophthalate groups to terephthalate groups was 0.04.

EXAMPLE 6

Samples of each of the polymers produced in accordance with Examples 1–5 and the comparative example were placed in a humidity chamber at a temperature of 40° C. and a relative humidity of 80%. The soil removable performance of each of the polymers was measured before storage and at specified times after 1, 2 or 3 weeks of storage as set forth in Table 2 and as described hereinafter.

TABLE 2

| | Soil Release performance at 0.6% active | | | | Soil Release performance at 0.9% active | | | |
|---|---|---|---|---|---|---|---|---|
| Example | Initial | 1 wk | 2 wks | 3 wks | Initial | 1 wk | 2 wks | 3 wks |
| 1 | 93 | 94 | 94 | 91 | 95 | 95 | na | na |
| 2 | 96 | 87 | na | na | na | na | na | na |
| 3 | 88 | na | na | na | 97 | na | na | na |
| 4 | 84 | na | 85 | na | 96 | na | 95 | na |
| 5 | 77 | 80 | na | 70 | 96 | 96 | na | 93 |
| Comparative | 96 | 50 | na | na | 96 | 67 | na | na |

Soil release performance was measured by prewashing samples of cloth with the designated polymers and drying the prewashed samples to form a coating thereon. The coated samples of cloth were stained with motor oil and then washed with a detergent composition containing a standard laundry detergent plus either 0.6% of the soil release polymer or 0.9% of the soil release polymer as set forth in Table 2. As indicated in Table 2, for example, a test indicated at the two week level means that the test sample containing the polymer was aged two weeks before the soil release properties were measured.

As shown in Table 2, the soil release properties of the comparative soil release compound having a molar ratio of isophthalate groups to terephthalate groups of 0.04 had an initial level of 96% which is regarded as excellent soil release performance. However, when the test sample containing the polymer aged for one week was tested for soil release properties, there was an appreciable decline in soil release performance down to levels of 50% (soil release performance at 0.6% active) and 67% (soil release performance at 0.9% active), respectively.

The polymers in accordance with the present invention exhibited high initial performance but unlike the comparative sample maintained excellent soil release performance after 1, 2 and 3 weeks. Thus, by controlling the molar ratio of isophthalate groups to terephthalate groups in the sulfonated polyester compound, the resulting polymer does not experience degradation of soil release properties over time as compared to the comparative sample having a lower molar ratio.

What is claimed is:

1. A sulfonated polyester compound useful as a soil release agent having isophthalate groups and terephthalate groups wherein the molar ratio of isophthalate groups to terephthalate groups is at least 0.15.

2. The sulfonated polyester compound of claim 1 wherein the molar ratio of isophthalate groups to terephthalate groups is from about 0.25 to 0.33.

3. The sulfonated polyester compounds of claim 1 wherein the sulfonated substituents of the sulfonated polyester compound are selected from the group consisting of 5-sulfoisophthalic acid and esters thereof, sulfobenzoic acid and esters thereof and isethionates.

4. The sulfonated polyester compound of claim 1 comprising monomers selected from the group consisting of dicarboxylic acids and esters thereof and polyols.

5. The sulfonated polyester compound of claim 4 wherein the dicarboxylic acids and esters thereof are selected from the group consisting of terephthalic acid, alkyl esters of terephthalic acid, phthalic acid, phthalic anhydride alkyl esters of phthalic acid, succinic acid, substituted succinic acid, esters of succinic acid, succinic anhydrides, adipic acid, and esters of adipic acid and combinations thereof.

6. The sulfonated polyester compound of claim 4 wherein the polyols are selected from the group consisting of ethylene glycol, 1,2-propanediol, 1,3-propanediol, glycerol and neopentyl glycol.

7. A method of producing a sulfonated polyester compound suitable for use as a soil release agent comprising:

a) reacting at least one compound of Formula (I):

$$XSO_3\text{—R—(COOY)}n \qquad \text{(I)}$$

wherein X is a cation,

R is an aryl group,

Y is selected from the group consisting of hydrogen and an alkyl group, and n is a positive integer with at least one compound of Formula (II):

$$R_1\text{—(OH)}m \qquad \text{(II)}$$

wherein $R_1$ is selected from the group consisting of an alkyl group, a cycloalkyl group and an aryl group, which may be substituted with an alkyl group or an aryl group, and m is a positive integer and optionally with a compound of Formula (III):

$$R_2\text{—(COOZ)}p \qquad \text{(III)}$$

wherein $R_2$ is selected from the group consisting of an alkyl group and an aryl group, Z is selected from the group consisting of hydrogen and an alkyl group, and p is a positive integer, and optionally with a compound of Formula (IV):

(IV)

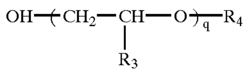

wherein $R_3$ and $R_4$ are each independently selected from the group consisting of hydrogen and an alkyl group, and q is a positive integer to produce at least one ester compound intermediate, and reacting the resulting ester compound intermediate with a homo- or co-poly (ethylene terephthalate) to produce the sulfonated polyester, wherein the amount of each of isophthalate and terephthalate-containing compounds is controlled to provide a molar ratio of isophthalate groups to terephthalate groups in the sulfonated polyester compound of at least 0.15.

8. The method of claim 7 wherein the molar ratio of isophthalate groups to terephthalate groups from about 0.25 to 0.33.

* * * * *